Patented Mar. 13, 1934

1,950,439

UNITED STATES PATENT OFFICE 1,950,439

HALOGENATED BUTADIENE POLYMER AND PROCESS FOR PRODUCING SAME

Wallace H. Carothers and James E. Kirby, Wilmington, Del., assignors to E. I. du Pont de Nemours & Company, Wilmington, Del., a corporation of Delaware No Drawing. Application May 6, 1931, Serial No. 535,577. Renewed May 20, 1933

20 Claims. (Cl. 260—6)

This invention relates to a method of preparing a new class of organic compounds. More particularly it relates to an improvement in the process of polymerizing the addition product of monovinylacetylene and hydrochloric acid, which improvement comprises carrying out the polymerization in the presence of certain sulfur compounds adapted to control both the rate of the reaction and the nature of the products thereby obtained.

Prior art

The addition product treated according to the present process is fully disclosed in an application of Carothers & Collins, Serial No. 490,538, filed October 22, 1930. It is chloro-2-butadiene-1.3 having the formula $CH_2=CCl—CH=CH_2$. The combination of monovinylacetylene with hydrogen chloride to form this product may be readily effected under a great variety of conditions. A preferred method consists in shaking or stirring monovinylacetylene with a concentrated aqueous solution of hydrogen chloride containing cuprous chloride and ammonium chloride. The chloro-2-butadiene-1,3 may be separated from the unreacted monovinylacetylene by distillation.

In a second application of Carothers & Collins, Serial No. 519,243, filed February 28, 1931, the polymerization of chloro-2-butadiene-1,3 to obtain products varying from liquids boiling below 100° C. (under 27 mm. pressure) to hard, resinous solids is disclosed. The accelerating effects which may be obtained by the use of catalysts such as oxygen and the peroxides and by the use of heat, light and pressure during the process of polymerization, and the regulation of these conditions to obtain polymers of varying hardness, strength and viscosity are fully discussed in the latter application. In a desired form the resulting polymer has to a large degree the properties of cured, natural rubber.

However, when the polymerization of chloro-2-butadiene-1,3 is carried out under the above described conditions, especially when it is carried out at elevated temperatures and in the presence of air, it proceeds at such a rapid rate that it is not easy to control the polymerization to produce a product of the desired characteristics. There is a tendency for the polymerization to progress to a state beyond that at which the rubber-like product can be milled or dispersed in solvents and this is particularly true when the amount of rubber-like polymer in the polymerizing mass exceeds about 30 to 50% of the total.

In an application of Williams, Serial No. 519,244 filed February 28, 1931, a process for preparing a plastic, rubber-like polymer from chloro-2-butadiene-1,3 has been disclosed. This process comprises the polymerization, with or without the aid of air, heat, light, etc., of the chloro-2-butadiene-1,3 to a viscous syrup or soft jelly containing 12 to 42% of rubber-like polymer. The unchanged chloro-2-butadiene-1,3 may be separated from the polymer by any suitable means, such as precipitation, evaporation, or distillation. The polymer obtained by this process is soluble in benzene and is sufficiently plastic to be readily worked on the rolls of a rubber mill. After the incorporation of suitable fillers, antioxidants, vulcanizing agents, etc., it can be cured to a vulcanized rubber having very desirable properties as regards strength, elasticity and the like.

In an application of Carothers, Collins and Kirby, Serial No. 519,241, filed February 28, 1931, a process for retarding the polymerization of chloro-2-butadiene-1,3 has been disclosed. In this process a small amount of a polymerization inhibitor such as catechol, pyrogallol, trinitrobenzene, diphenylguanidine, m-toluylenediamine, or iodine is added to the chloro-2-butadiene-1,3 before polymerization with the result that the chloro-2-butadiene-1,3 can be stored for long periods without change, or polymerized at a rate permitting the polymerization to be controlled to more certainly yield a product having the degree of polymerization and properties desired.

The polymerization of chloro-2-butadiene-1,3 is difficult of control and under ordinary conditions yields a mixture of products in various stages of polymerization. While it is possible to control the rate and direction of the polymerization by the use of inhibitors such as those mentioned in the above identified application of Carothers, Collins and Kirby, the usefulness of that process is impaired by the following difficulties. In the first place, chloro-2-butadiene-1,3 polymerizes very slowly in the presence of inhibitors and it is often necessary to heat the polymerizing mass for prolonged periods of time in order to obtain a high yield of rubber-like product. Secondly, when powerful inhibitors such as pyrogallol or trinitrobenzene are used to prevent the formation of elastic, non-plastic polymerization products, considerable amounts of an oily polymer capable of being distilled are formed simultaneously with the formation of the desired product. It is necessary to remove this oily by-product by washing, evaporation or other suitable means before vulcanizing the plastic mass to a product resembling cured natural rubber. In the third place, plastic polymers formed by polymerizing chloro-2-butadiene-1,3 in presence of inhibitors are not always capable of being cured to rubber-like products of satisfactory strength and elasticity.

Object of invention

The object of the present invention, therefore, is to produce in purer form greater yields of a soft, plastic polymer, soluble in benzene, capable of being worked on the rolls of a rubber mill and vulcanized, after incorporation of suitable fillers, softeners, antioxidants, vulcanizing agents, etc., to a strong, elastic product resembling cured natural rubber. It is also an object of this invention to perfect the control, the rate and direction of the polymerization to the end that maximum yields of the desired product may be obtained.

Description of invention

With these objects in view, it has been discovered that the control of the polymerization of chloro-2-butadiene-1,3 can be improved if the polymerization is carried out in presence of sulfur or certain sulfur compounds, or both. By the use of sulfur alone it is possible to obtain, in nearly quantitative yields, a strong, elastic, non-plastic product resembling a cured natural rubber but differing from cured natural rubber in that it not merely swells but completely dissolves in benzene. By employing a sulfur-containing compound of the class set forth below, either alone or in conjunction with sulfur, it is possible to obtain, in high yields, products that are not only soluble but also plastic, and by varying the ratio of sulfur and sulfur compound to the chloro-2-butadiene-1,3 it is possible to obtain products having any desired degree of plasticity from sticky syrups to very tough masses.

The high yields obtainable by the process described in this application render unnecessary the recovery of large quantities of unpolymerized chloro-2-butadiene-1,3. When prepared by the process of the present invention the rubber-like polymers may be dissolved, compounded with suitable materials, or utilized in any other desired manner without being subjected to any purification processes.

In addition to having a great effect on the yield and properties of the products obtained by polymerizing chloro-2-butadiene-1,3, the agents herein described also have a marked influence on the rate of the reaction. As described below and illustrated in the examples, by the use of these agents and proper choice of conditions the rate of conversion of chloro-2-butadiene-1,3 to rubber-like polymers may be varied at will from a very much lower to a markedly greater velocity than that of chloro-2-butadiene-1,3 containing no added reagents. Because of this effect on the rate of the reaction the agents of the present process are called catalysts.

Among the sulfur compounds which have been found particularly adapted for use in this connection may be mentioned the thiuramdisulfides such as tetramethyl thiuramdisulfide, tetraethyl thiuramdisulfide, tetrabutyl thiuramdisulfide, diphenyl dimethyl thiuramdisulfide, and diphenyl diethyl thiuramdisulfide. The polymerization may of course be carried out in the presence of both sulfur and the thiuramdisulfide.

In carrying out the process, the sulfur, sulfur-compound, or both, is dissolved in the chloro-2-butadiene-1,3 and the resulting solution is then subjected to any of the conditions fully described in the above identified applications as adapted to effect or affect polymerization. By a careful control of the conditions of polymerization and amount of catalyst employed, a product of the desired properties may be produced. By this means it is possible to produce a plastic, rubber-like mass capable of being dissolved in benzene or readily rolled out into a thin coherent sheet on a rubber mill. After the incorporation of suitable curing agents it is possible to cure the plastic product, which may be molded to any desired shape, to a product resembling a cured natural rubber. The vulcanizates thus prepared, when exposed to air over a considerable period of time, do not evidence any appreciable change in properties such as extensibility and strength and retain their original appearance.

In order to better disclose the invention in detail, the following examples are furnished. It should be understood, however, that these examples are presented merely as illustrations of the process and that the conditions, reagents and quantities therein specified may be widely varied. All parts and percentages are by weight.

Example I

A sample of chloro-2-butadiene-1,3 in which has been dissolved a small amount of sulfur (0.25–1.0%) is allowed to stand in a closed vessel, in the presence of a small amount of air, at the ordinary temperature. After 3 to 5 days it has set to a colorless, transparent jelly. After 6 to 12 days no unchanged chloro-2-butadiene-1,3 remains. The product is a pale yellow, transparent, exceedingly strong, elastic mass. It is not plastic but it is completely soluble in benzene, carbon disulfide, and the other usual rubber solvents. Under otherwise similar conditions but in the absence of the sulfur, the course of the reaction and the nature of the products are practically the same except that the product is not dissolved but only swelled by benzene or other solvents.

Example II

Chloro-2-butadiene-1,3 containing 0.5% of tetramethyl thiuramdisulfide and 0.3% of sulfur is polymerized as in Example I. After 10 days it has set to a jelly and after 3 to 4 weeks the polymerization is complete. The product is a soft, plastic, rubber-like mass completely soluble in benzene. It can be readily worked on the rollers, mixed with fillers, stabilizers, etc., and then cured. Thus, a sample of this product is mixed with 10% of its weight of zinc oxide, and then heated in a mold for 20 minutes at 135° C. The product is a cured soft rubber of good quality.

Example III

Chloro-2-butadiene-1,3 containing 0.5% of tetramethyl thiuramdisulfide is polymerized as in Example I. After 8 days it has set to a jelly and after about 6 weeks all the chlorobutadiene is polymerized. The product is a soft, somewhat elastic, tough mass, sufficiently plastic to be worked on the rollers. On being heated to 100° C. it becomes considerably softer. It is completely soluble in benzene. This product is somewhat less plastic and not quite as soft as the product described in Example II. It can be however compounded, molded and cured in a manner similar to that described in Example II.

*Example IV*

Chloro-2-butadiene-1,3 containing 0.5% of tetramethyl thiuramdisulfide and 1.0% of sulfur is polymerized as in Example I. In 6 weeks about 80% of the chlorobutadiene is polymerized and the unchanged chloro-2-butadiene-1,3 is removed by evaporation. The residue is a very soft, sticky, brown paste having no elastic properties. It is completely soluble in benzene, and may be compounded, molded and cured in the manner indicated in Example II.

*Example V*

Chloro-2-butadiene-1,3 containing 0.5% of tetramethyl thiuramdisulphide and 0.3% of sulfur is placed in a closed container of ordinary soda glass and at 35° C. it is illuminated with a 150 watt Mazda lamp. After 68 hours all of the chlorobutadiene is polymerized. The product is a tough, slightly elastic, plastic solid, soluble in benzene and resembling uncured natural rubber. It can be worked, compounded, molded and cured as indicated in Example II.

*Example VI*

Chloro-2-butadiene-1,3 containing 0.5% of tetramethyl thiuramdisulfide and 0.3% sulfur is polymerized at 35° C. with direct illumination from a 150 watt Mazda lamp as in Example V. After 40 hours about 85 to 90% of the chlorobutadiene is polymerized. The product obtained is completely soluble in benzene, and is softer and more plastic than the product described in Example V. Five parts of zinc oxide, 2 parts of stearic acid and 100 parts of the plastic mass described in this example are thoroughly mixed on the rolls of the rubber mill. The resulting mass is then cured in a mold. The vulcanization may be carried out by heating for 1 to 3 hours at 80° C. or at 120 to 140° C. for 15 minutes. The product is a cured soft rubber of good quality.

*Example VII*

Chloro-2-butadiene-1,3 containing 0.76% of diphenyl dimethyl thiuramdisulfide and 0.3% sulfur is polymerized as in Example V. After 48 hours it has set to a soft jelly and about 73% of the chlorobutadiene is polymerized. After removal of the unchanged chloro-2-butadiene-1,3 by any appropriate means such as evaporation, distillation, etc., there remains a soft, plastic, non-elastic, benzene-soluble mass. This product may be readily worked on the rolls of a rubber mill and, after incorporating any desired fillers, antioxidants, etc., it may be cured to a vulcanized, soft rubber of good quality. Thus, 100 parts of the soft, plastic mass prepared as described in this example, is thoroughly incorporated with 5 parts of zinc oxide, 2 parts of stearic acid and 1 part of benzidine. After curing in a mold for 15 minutes at 140 to 150° C. a product having good strength and elasticity and closely resembling soft, vulcanized natural rubber is obtained.

*Example VIII*

Chloro-2-butadiene-1,3 containing 0.82% of diphenyl diethyl thiuramdisulfide and 0.3% of sulfur is polymerized as in Example V. After 48 hours it is nearly completely converted to an elastic, non-plastic mass resembling a cured natural rubber. It does not dissolve, but only swells, in benzene. Under otherwise similar conditions but using 1.0% of sulfur instead of 0.3%, the chloro-2-butadiene-1,3 is converted to a fairly tough, plastic, non-plastic benzene-soluble mass in 86% yield. The plastic mass thus obtained may be milled, compounded as desired, molded and then cured as in Examples III, VI, or VII.

*Example IX*

Chloro-2-butadiene-1,3 containing 0.5% of tetramethyl thiuramdisulfide is heated for 24 hours at 62° C. in a closed container in presence of a small amount of air. A tough, yellow, elastic, benzene-soluble, somewhat plastic mass is obtained in yields above 97% of the weight of the original chloro-2-butadiene-1,3. Under otherwise similar conditions but in the absence of the tetramethyl thiuramdisulfide only 48% of the chlorobutadiene is converted to rubber-like polymer and the polymer thus obtained has no plastic properties. The product may be milled, compounded, molded and cured in the manner indicated in Example VIII.

*Example X*

Chloro-2-butadiene-1,3 containing 0.5% of tetramethyl thiuramdisulfide and 0.5% of sulfur is polymerized as in Example IX. After 24 hours, 97% of the chloro-2-butadiene-1,3 is converted to a tough, elastic, benzene-soluble, rubber-like mass having somewhat greater plasticity than the product prepared in accordance with Example IX, using only the thiuramdisulfide and no sulfur. This product may be milled, compounded, molded and cured similarly to the product of Example VIII.

It will be understood that the amount of catalyst to be employed may vary widely depending upon the effectiveness of the given compound and on the result desired. Appreciable effects may be obtained from the use of quantities of catalyst as low as 0.1% of the chloro-2-butadiene-1,3 and as the amount of catalyst is increased the softness, plasticity and solubility increase. The presence of sulfur enhances the effect of the thiuramdisulfide and for a given amount of thiuramdisulfide the softness, plasticity, etc., increase with increasing amounts of sulfur. Up to 2% each of both sulfur and thiuramdisulfide may be used, the invention contemplating the use of any quantity of catalyst which will effect the results set forth herein.

It will be evident from the above examples that the present invention contemplates the use of specific catalysts in combination with any of the conditions disclosed in the previously filed Carothers & Collins applications as adapted to effect polymerization. Thus, the agents of the present invention may be added to chloro-2-butadiene-1,3 to be polymerized in the presence or absence of air, below or above ordinary temperature and pressure, and in the presence or absence of direct light.

It will be understood that other thiuramdisulfides such as those named can be used in a similar manner to those compounds specifically illustrated in the examples and that they produce a similar effect.

As these examples illustrate, the presence of the thiuramdisulfide under the ordinary conditions results in a considerable decrease in the rate of polymerization, but this disadvantage is readily overcome without sacrificing any of the desirable effects by carrying out the polymerization in the presence of light or heat or both. Under certain conditions the conversion of chloro-2-butadiene-1,3 to rubber-like polymers is considerably more rapid in the presence of a thiuramdisulfide than under otherwise similar conditions in the absence of the thiuramdisulfide. (Examples IX and X). It will be seen, therefore, that by careful choice of the kind and amount of thiuramdisulfide, of the amount of sulfur, and of the conditions of polymerization that the rate of polymerization can be varied at will from a velocity much lower to a velocity considerably greater than that of chloro-2-butadiene-1,3 in the absence of the herein described agents and at the same time exert the desired control on the properties of the resulting polymer.

The plastic product obtained in accordance with this invention, and particularly that resulting from the polymerization of chloro-2-butadiene-1,3 in the presence of both thiuramdisulfide and sulfur, readily cures to an elastic, non-plastic, insoluble product resembling cured or vulcanized natural rubber. Conditions suitable for curing the plastic polymer are generally the same as those described, in a pending application of Ira Williams, Serial Number 519,244, filed February 28, 1931, as suitable for the curing of the plastic polymer of chloro-2-butadiene-1,3 prepared according to the process described in that application. The Williams application describes the curing of plastic chloro-2-butadiene-1,3 polymer under a variety of conditions. It states that preferred curing aids are zinc dust, zinc oxide, and the like, that curing proceeds faster generally with higher temperatures than with lower, the preferred curing temperatures residing between 50° and 180° C., that the plastic polymer may be milled, mixed, or molded in the same way as natural rubber, that various fillers and modifying agents for diluting, reinforcing, cheapening, retarding, accelerating, protecting against oxidation, etc. may be added to the plastic polymer, such materials including specifically compounds such as zinc oxide, zinc dust, lithopone, Blanc Fixe, clay, iron oxide, whiting, lime, magnesium carbonate, carbon, slate flour, pine tar, mineral oil, paraffin, mineral rubber, vulcanized oil, rosin, diphenyl guanidine, sulfur, phenyl beta naphthylamine, fatty acids, cork dust, ground leather, cotton, sawdust, and asbestos. It is further stated that the plastic polymer may be molded, spread, calendered, extruded, pressed, and the like, being then cured according to the described methods.

The conditions under which curing is effected do not require the accurate control customarily exercised in the process of vulcanizing natural rubber, for although the product cures very rapidly, it does not appear to be adversely effected by over-curing. Thus samples of plastic polymer cured for two hours at 140° C. differ but slightly from samples of the same stock which have been satisfactorily cured for fifteen minutes at 120° C.

In general, it may be stated that curing is favored by elevated temperatures of the order of those mentioned in the examples given, and the higher temperatures illustrated as suitable for use effect a more rapid rate of curing and produce products which tend to retain their pliability and extensibility for a longer period of time. The products obtained by the method of curing illustrated in Examples V and VI when direct light and heat are used in the initial stage of the polymerization retain their pliability, extensibility and strength over long periods of time.

The curing of the plastic polymers is aided by the use of agents such as zinc oxide, preferably used in amount from 2 to 10% of the weight of the plastic products. The great effectiveness of zinc oxide as a preferred curing aid has been definitely illustrated in the examples.

The effect of fillers, softeners, and the like on the curing is in general the same as that described in the method of Williams application referred to above. Antioxidants markedly retard deterioration of the final elastic products, samples protected with antioxidants retaining their strength over long periods of time and exhibiting no surface cracking. Sulfur and the ordinary organic rubber vulcanization accelerator have no beneficial effect on the rate of curing or on the properties of the cured product, and the use of sulfur has a definitely deleterious effect on the aging of the product.

The foregoing examples and description are illustrative only and are not intended to limit the scope of the invention. Any embodiments of the invention or variations which do not depart from the spirit of the invention, are intended to be embraced within the scope of the claims.

We claim:

1. In the process of controlling the polymerization of chloro-2-butadiene-1,3 the improvement which comprises polymerizing in the presence of a member of the group consisting of sulfur and the thiuramdisulfides.

2. In the process of controlling the polymerization of chloro-2-butadiene-1,3 the improvement which comprises polymerizing in the presence of sulfur.

3. In the process of controlling the polymerization of chloro-2-butadiene-1,3 the improvement which comprises polymerizing in the presence of a thiuramdisulfide.

4. In the process of controlling the polymerization of chloro-2-butadiene-1,3 the improvement which comprises polymerizing in the presence of a thiuramdisulfide having four N-substituted hydrocarbon radicals.

5. In the process of controlling the polymerization of chloro-2-butadiene-1,3 the improvement which comprises polymerizing in the presence of tetramethyl thiuramdisulfide.

6. In the process of controlling the polymerization of chloro-2-butadiene-1,3 the improvement which comprises polymerizing in the presence of both sulfur and a thiuramdisulfide.

7. In the process of controlling the polymerization of chloro-2-butadiene-1,3 the improvement which comprises polymerizing in the presence of sulfur and tetramethyl thiuramdisulfide.

8. In the process of controlling the polymerization of chloro-2-butadiene-1,3 the improvement which comprises polymerizing in the presence of at least one member of the group consisting of sulfur and a thiuramdisulfide under the influence of heat.

9. In the process of controlling the polymerization of chloro-2-butadiene-1,3 the improvement which comprises polymerizing in the presence of at least one member of the group consisting of sulfur and a thiuramdisulfide under the influence of direct light.

10. In the process of controlling the polymerization of chloro-2-butadiene-1,3 the improvement which comprises polymerizing in the presence of at least one member of the group consisting of sulfur and a thiuramdisulfide under pressure above atmospheric.

11. A plastic, benzene-soluble mass obtained by polymerizing chloro-2-butadiene-1,3 in the presence of a member of the group consisting of sulfur and a thiuramdisulfide.

12. A tough, elastic, non-plastic benzene-soluble mass obtained by polymerizing chloro-2-butadiene-1,3 in the presence of sulfur.

13. A plastic, benzene-soluble mass obtained by polymerizing chloro-2-butadiene in the presence of a thiuramdisulfide.

14. A plastic, benzene-soluble mass, resembling uncured natural rubber, obtainable by polymerizing chloro-2-butadiene-1,3 in the presence of a thiuramdisulfide, and sulfur, capable of being worked on the rolls of a rubber mill and subsequently cured to a tough, elastic, non-plastic, insoluble product resembling cured natural rubber.

15. A soft, plastic, benzene-soluble mass, resembling uncured natural rubber, obtainable by polymerizing chloro-2-butadiene-1,3 in the presence of 0.5% tetramethyl thiuramdisulfide and 0.3% sulfur in the presence of a small amount of air, at 35° C. in the presence of direct light for 48 hours, capable of being worked on the rolls of a rubber mill and vulcanized to a product resembling cured natural rubber.

16. A non-plastic, benzene-soluble polymer of chloro-2-butadiene-1,3.

17. In the process of controlling the polymerization of chloro-2-butadiene-1,3, the improvement which comprises polymerizing in the presence of a member of the group consisting of sulfur and the thiurampolysulfides.

18. In the process of controlling the polymerization of chloro-2-butadiene-1,3 the improvement which comprises polymerizing in the presence of a thiurampolysulfide.

19. In the process of controlling the polymerization of chloro-2-butadiene-1,3 the improvement which comprises polymerizing in the presence of both sulfur and a thiurampolysulfide.

20. A polymer obtained by polymerizing chloro-2-butadiene-1,3 in the presence of a thiurampolysulfide.

WALLACE H. CAROTHERS.
JAMES E. KIRBY.